United States Patent
Ugalde Diaz et al.

(10) Patent No.: US 11,941,451 B2
(45) Date of Patent: Mar. 26, 2024

(54) ORCHESTRATION OF CONTAINERIZED APPLICATIONS

(71) Applicant: Siemens Aktiengesellschaft, Munich (DE)

(72) Inventors: Ines Ugalde Diaz, Belmont, CA (US); Martin Sehr, Kensington, CA (US); Juan L. Aparicio Ojea, Moraga, CA (US); Michael Unkelbach, Buckenhof (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 498 days.

(21) Appl. No.: 17/278,954

(22) PCT Filed: Aug. 30, 2019

(86) PCT No.: PCT/US2019/049033
§ 371 (c)(1),
(2) Date: Mar. 23, 2021

(87) PCT Pub. No.: WO2020/072155
PCT Pub. Date: Apr. 9, 2020

(65) Prior Publication Data
US 2022/0035670 A1 Feb. 3, 2022

Related U.S. Application Data

(60) Provisional application No. 62/740,034, filed on Oct. 2, 2018.

(51) Int. Cl.
G06F 9/50 (2006.01)
G06F 9/48 (2006.01)
G06N 5/02 (2023.01)

(52) U.S. Cl.
CPC ............ G06F 9/505 (2013.01); G06F 9/4881 (2013.01); G06N 5/02 (2013.01); *G06F 2209/5019* (2013.01)

(58) Field of Classification Search
CPC ............... G06F 9/505; G06F 9/4881; G06F 2209/5019; G06N 5/02
See application file for complete search history.

(56) References Cited

U.S. PATENT DOCUMENTS

| 2007/0240161 A1* | 10/2007 | Prabhakar | G06F 9/505 718/104 |
| 2014/0229221 A1* | 8/2014 | Shih | G06Q 10/06312 705/7.23 |
| 2018/0103088 A1* | 4/2018 | Blainey | H04L 67/10 |

OTHER PUBLICATIONS

International Search Report dated Nov. 14, 2019; Application No. PCT/US2019/049033; 10 pages.

(Continued)

*Primary Examiner* — Wissam Rashid

(57) ABSTRACT

A system and method are disclosed for orchestrating the execution of computing tasks. An orchestration engine can receive task requests over a network from a plurality of process engines. The process engines may correspond to respective edge or field devices that are remotely located as compared to the orchestration engine. Each task request may indicate at least one task requirement for executing a respective computing task. A plurality of computing instances that have available computing resources can be selected from a set of computing instances. A predicted runtime can be generated for each of the computing tasks. In an example, based on the predicted runtimes, task requirements, available computing resources, and associated network conditions, a schedule and allocation scheme are determined by the orchestration engine. The schedule and allocation scheme define when each of the plurality of computing tasks is performed, and which of the plurality of selected com- (Continued)

puting instances performs each of the plurality of computing tasks. The selected computing instances execute the plurality of computing tasks according to the schedule and allocation scheme.

15 Claims, 5 Drawing Sheets

(56) References Cited

OTHER PUBLICATIONS

Cheng Dazhao et al: "Resource and Deadline-Aware Job Scheduling in Dynamic Hadoop Clusters", 2014 IEEE 28th International Parallel and Distributed Processing Symposium, IEEE, May 25, 2015 (May 25, 2015), pp. 956-965, XP033177655 / May 28, 2015.

* cited by examiner

ORCHESTRATION OF CONTAINERIZED APPLICATIONS

CROSS REFERENCE TO RELATED APPLICATIONS

This application is a national phase filing under 35 U.S.C. § 371 of International Patent Application No. PCT/US2019/049033, filed Aug. 30, 2019, which claims the benefit of priority to U.S. Provisional Patent Application Ser. No. 62/740,034, filed Oct. 2, 2018, both of which are incorporated herein by reference in their entireties.

TECHNICAL FIELD

This application relates to computing, for instance utility computing. More particularly, this application relates to systems and methodologies for orchestrating computing tasks on computing platforms.

BACKGROUND

Containerization can be used to deploy control software located in remote locations or locations that are difficult to access. When such deployment is time sensitive, however, such software is often provided by on-site technical support. For example, expert technicians can be dispatched to remote or limited access locations, such as offshore oil platforms, desert solar farms, etc. It is recognized herein that providing on-site support in such locations is not only expensive, but it also might impede supplying immediate response to other critical incidents, such as incidents that can stop production or cause irreparable damage to infrastructure. In some cases, rather than dispatching experts to remote locations, high performance computing hardware can be implemented at remote locations. It is further recognized herein, however, that such hardware can be expensive and difficult to maintain, among other shortcomings. Furthermore, maintenance can be particularly difficult in remote locations that are subject to adverse conditions.

In utility computing applications, a container may include a light-weight executable package of software. The container may include everything needed to run the software. Software containers can enable streamlined application portability across different environments. For this reason, among others, containerizing applications is a common practice for exporting services from host systems to computing platforms. Recent development in container technology has allowed the exploration of containers based on real-time operating systems, namely, real-time containers. One of the challenges of real-time containers is scheduling container execution with real-time guarantees while using minimal computing resources.

SUMMARY

Embodiments of the invention address and overcome one or more of the described-herein shortcomings by providing methods, systems, and apparatuses that orchestrate containerization of applications associated with real-time requirements. Aspects of the invention include methods and systems for executing a plurality of computing tasks. An orchestration engine can receive task requests over a network from a plurality of process engines. The process engines may correspond to respective edge and/or field devices that are remotely located as compared to the orchestration engine. Each task request may indicate at least one task requirement for executing a respective computing task. A plurality of computing instances that have available computing resources can be selected from a set of computing instances. A predicted runtime can be generated for each of the computing tasks. In an example, based on the predicted runtimes, task requirements, and available computing resources, a schedule and allocation scheme are determined by the orchestration engine. The schedule and allocation scheme define when each of the plurality of computing tasks is performed, and which of the plurality of selected computing instances performs each of the plurality of computing tasks. The selected computing instances execute the plurality of computing tasks according to the schedule and allocation scheme.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures.

DETAILED DESCRIPTION

Methods and systems are disclosed for orchestrating the containerization of applications from edge and/or field devices with real-time requirements onto computing platforms. It is recognized herein that current approaches to containerization solutions for real-time applications lack capabilities and efficiencies. For example, real-time performance is often not guaranteed because each application is granted a dedicated computing instance for its execution so as to produce real-time behavior, but no mechanism is in place to enforce it. It is further recognized herein that having a dedicated computing instance for each application is inefficient and not scalable to a large number of applications. Further still, network transport delays are not taken into account in current approaches.

In an example aspect, an orchestration engine receives task requests over a network from a plurality of process engines. The process engines may correspond to respective edge and/or field devices that are remotely located as compared to the orchestration engine or as compared to a computing platform that executes the tasks. Each task request may indicate at least one task requirement for executing a respective computing task. For example, some computing tasks may need to be performed in real-time. In some cases, computing tasks performed in real-time may mean that data from the tasks is available within specific time requirements as feedback. Some computing tasks performed in real-time output data that is available virtually immediately, for instance within milliseconds, as feedback. In an example, based on the predicted runtimes of tasks, task requirements, and available computing resources, the orchestration engine determines a schedule and allocation scheme. The schedule and allocation scheme define when each of the plurality of computing tasks is performed, and where (i.e. which computing instance) each of the computing tasks is performed.

The disclosed methods and systems present an improvement to the functionality of the computer used to perform such a computer-based task. Furthermore, the disclosed methods and systems can reduce the need for expensive high-performance local computing hardware by extracting real-time control software located in remote or difficult access locations. Such local hardware may be difficult to maintain in practice. In various examples, the real-time software can be extracted to computing platforms where extensive computing resources are available and where technical support may be offered instantaneously. In some cases, in accordance with various example embodiments, even though 5G access and core networks can provide low latency and high communication reliability, network effects are taken into account when containerizing time-critical applications for computation on external platforms.

Figure 1:
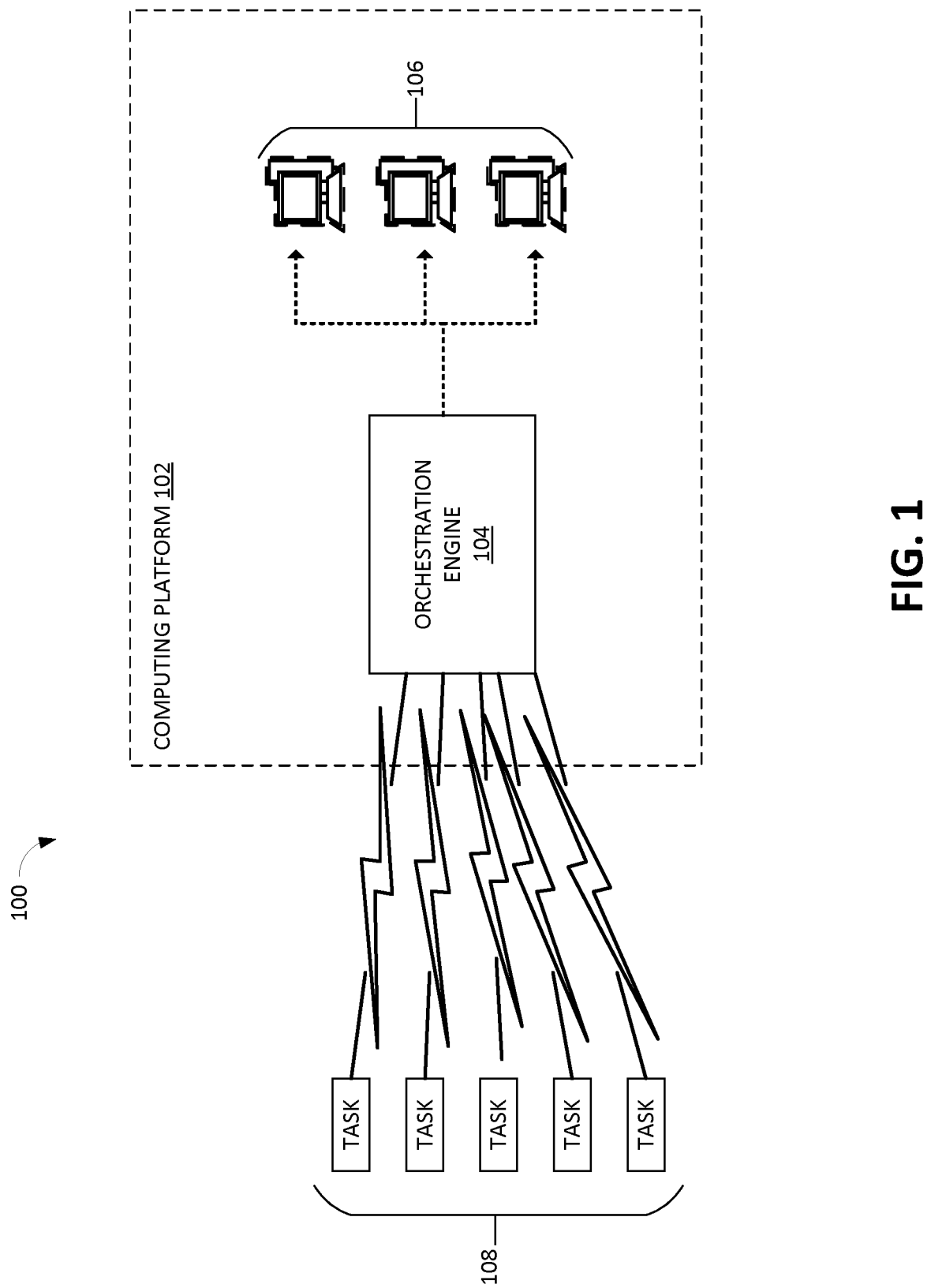
FIG. 1 is a block diagram of an example architecture that includes an orchestration engine according to embodiments of the present disclosure.

Referring initially to FIG. 1, an example architecture or system 100 is shown for executing computing tasks, in accordance with embodiments of the present disclosure. The system 100 includes a computing platform 102 that includes an orchestration engine 104 and a plurality of computing instances 106 in communication with the orchestration engine 104. In particular, the orchestration engine 104 can instruct the computing instances 106 to execute respective tasks at specific times, so as to conserve computing resources of the computing instances 106 while satisfying task requirements, such as real-time task requirements for example. The computing instances 106 may include virtual central processing units (CPUs), virtual servers, edge baremetal resources, or the like. In some examples, the computing instances 106 may differ based on the computing platform in which the computing instances 106 are implemented. The computing instances 106 may have the same or different processing capabilities with respect to one another. The computing platform 102 may be implemented as a cloud computing platform such that the orchestration engine 104 and computing instances 106 run in the cloud. Alternatively, each of the computing instances 106 and the orchestration engine 104 may run on separate, distinct resources. Alternatively still, the computing instances 106 and the orchestration engine 104 may run on a combination of the cloud and separate resources.

It will be appreciated that the example system 100 is simplified for purposes of explanation, and that other systems can be used to perform the computing task orchestrations described herein, and all such systems are contemplated as being within the scope of this disclosure. For example, the computing platform 102 can include any number of computing instances 106 as desired. Furthermore, the orchestration engine 104 and the computing instances 106 may be hosted on any number of devices at any number of physical locations. In an example, the orchestration engine 104 is hosted on a single device that is located at the same location as the computing instances 106, although it will be understood that embodiments described herein are not limited as such.

The example system 100 further includes a plurality of tasks 108. The tasks 108 may be sent to the orchestration engine 104 in containers. As used herein, unless otherwise specified, a container refers to an executable package of software. For example, the orchestration engine 104 may receive real-time tasks in containers, or containerized real-time applications. Additionally, or alternatively, the tasks 108 may be sent to the orchestration engine 104 as data. For example, tasks 108 may be sent to the orchestration engine 104 as input data for software that is already available to the computing platform 102. Thus, tasks 108 may be provided to the orchestration engine 106 as containers and/or data.

Figure 2:
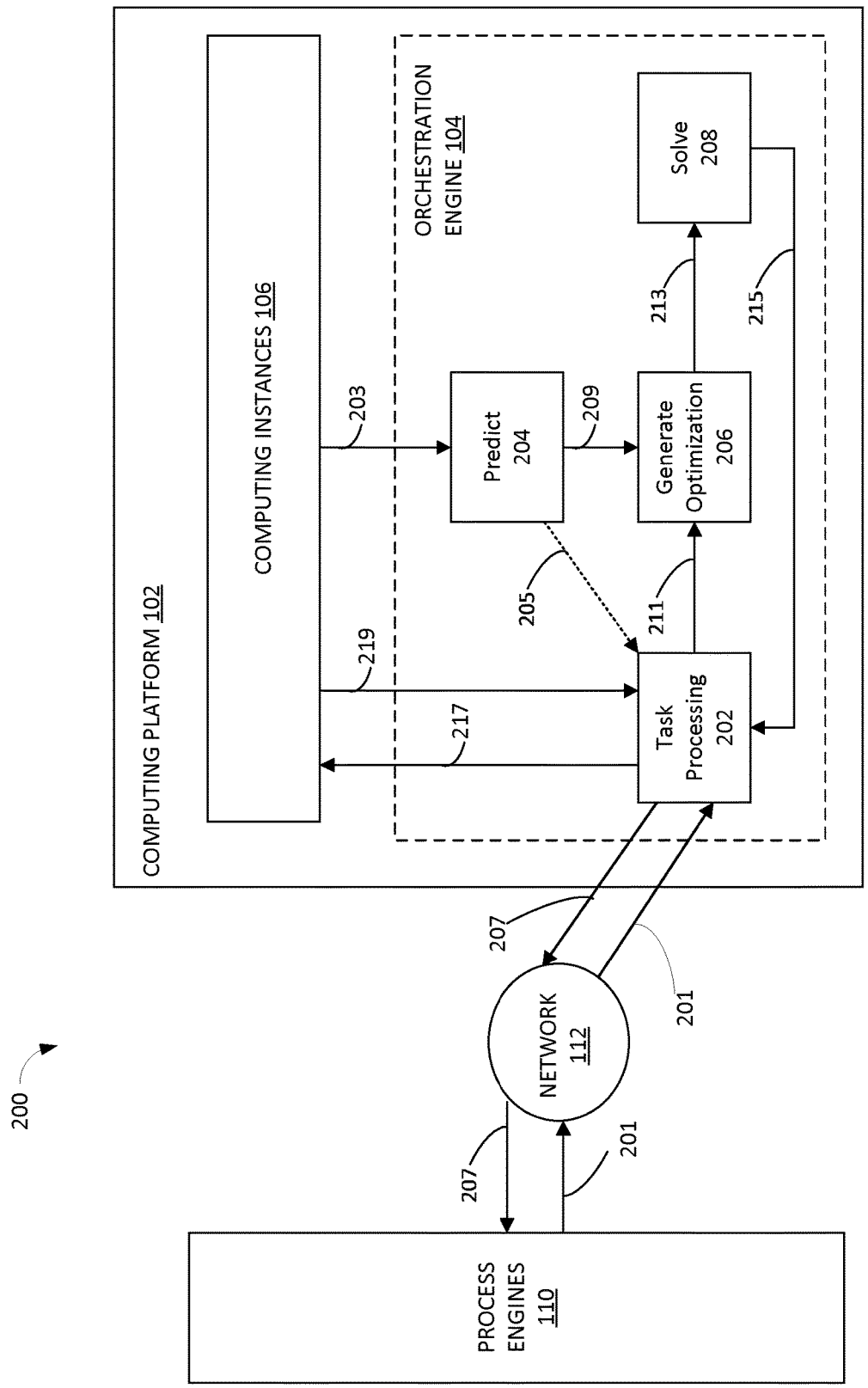
FIG. 2 is a process diagram that depicts example processes performed by the orchestration engine and other nodes within an example computing platform, according to embodiments of this disclosure.

Referring also to FIG. 2, example processes that can be performed within the computing platform 102 are shown. FIG. 2 shows an example system 200 that includes the computing platform 102 in communication with a plurality of process engines 110 over a network 112. In some cases, the process engines 110 correspond to respective machinery or edge or field devices that are remotely located as compared to the orchestration engine 104, and thus the computing platform 102. The process engines 110 can send tasks 108 to the orchestration engine 104. By way of example, the tasks 108 can be associated with the operation of machinery or devices that correspond to the process engines 110, such that the computing platform 102 can provide real-time control of the machinery or devices. The computing platform 102 can be remote as compared to the process engines 110. Thus, the computing platform 102 can be remote as compared to the devices and machinery that correspond to the process engines 110. In such a configuration, the computing platform 102 can remotely provide services for real-time operations. For example, the process engines 110 can correspond to the operation of a gas turbine on a remote oil platform, such that the computing platform 102 can control the gas turbine from a remote location as compared to the gas turbine. Alternatively, the computing platform 102 can be co-located with the process engines 110.

It will be appreciated that the orchestration engine 104, and thus the computing platform 102, can be configured to perform operations for any process engines 110 as desired. Further, the process engines 110 can be co-located with respect to each other so as to provide services for a common operation, or the process engines 110 can be distributed at different locations so as to provide services for operations that are independent from each other. The process engines 110 and orchestration engine 104 can communicate with each other over the network 112, which may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between process engines 110 and the computing platform 102, in particular the orchestration engine 104. The network 112 may be wired, wireless or a combination thereof. Additionally, several networks may work alone or in communication with each other to facilitate communication in the network 112.

With continuing reference to FIG. 2, at 201, task requests are sent by the process engines 110 and received by the orchestration engine 104. The task requests may correspond to the plurality of computing tasks 108. The task requests may be received over the network 112 from the process engines 110, and each task request may indicate at least one task requirement for executing a respective computing task 108. At 202, the orchestration engine 104 processes the task requests. In particular, the orchestration engine 104 may generate a priority for completing each task request. Tasks 108 may be completed in an order defined by the respective priorities. In some cases, tasks having a higher priority as compared to other tasks having a lower priority are performed before the lower-priority tasks. In various examples, the priorities are determined and generated based on the task requirements. For example, in some cases, each container that includes one or more tasks 108 is associated with a list of task requirements. Alternatively, or additionally, each task within a container may be associated with its own task requirements. By way of example, if there is a task requirement that a given computing task is completed in real-time, the orchestration engine 104 assigns a priority to that task that is higher than the priority for a different task having a requirement that it be completed within an hour, for example, or some time greater than immediately.

In some examples, task requests or tasks 108 may indicate a specific deadline for completion of the respective task or task requests. Thus, the task requirements may include specific deadlines, and priorities may be assigned based on the deadlines. Alternatively, or additionally, an example task requirement may indicate a task precedence order for completing multiple tasks. For example, a first task may need to execute before a second task can be executed, thus the first task may indicate a precedence over the second task. Continuing with the example, the first task can be assigned a higher priority than the second task. Furthermore, task priorities can change over time. For example, the priority for a given task may increase as its deadline approaches. Referring again to the task precedence example, in some cases, the second task is not scheduled until the first task having precedence is scheduled. Thus, the priority of the second task may depend on the deadline of the first task, and thus the priority of the second task may increase as the deadline of the first task approaches. In addition to task deadlines, task precedence, and the like, criteria for determining task priorities may also include network conditions associated with processing the tasks and sending/receiving inputs/outputs related to the tasks, as further described below.

The orchestration engine 104 can monitor the computing instances 106. The orchestration engine 104 may continuously or periodically monitor the computing instances 106 so as to continuously or periodically determine the status of the computing resources of the computing instances 106. The orchestration engine 104 may monitor the utilization of each computing instance 106. A given computing instance 106 may have a different virtual core with different processing capabilities as compared to other computing instances 106. By monitoring the utilization of each computing instance 106, the orchestration engine 104 can identify a quantifiable amount of computing resources of the computing instances 106 that are available at any given time. Thus, in an example, after receiving task requests over the network 112, the orchestration engine 104 selects computing instances 106 from a set of computing instances, wherein the selected computing instances 106 have available computing resources.

The orchestration engine 104 may also monitor the network 112 continuously or periodically. In an example, the orchestration engine 104 monitors network effects, such as delay or jitter, for tasks 108, for instance for every task 108. Furthermore, the orchestration engine 104 may identify respective destinations associated with each completed computing task. For example, the task requests may indicate from which process engine 110 the associated task originated, which may correspond to the destination of the task output. Alternatively, or additionally, the task request may indicate to which process engine 110 the associated task output should be sent. At 202, the orchestration engine 104 can generate task priorities based also on network effects associated with the task. Thus, the orchestration engine 104 may generate a priority order for completing the task requests, based on the task requirements and performance of the network 112. By way of example, if a first and second example task have the same task requirements, but the output of the second task is destined for a process engine 110 associated with network delays that have been observed by the orchestration engine 104, the orchestration engine 104 may assign, based on network effects, a priority to the second task that is higher than the priority for the first task. Thus, in some cases, the orchestration engine 104 can assign a higher (or lower) priority for a given task as compared to another task even though the tasks may have the same task requirements, due to a state of the network associated with the given task. The state of the network associated with different tasks may vary due to various reasons. For example, and without limitation, the network connection for a given task may exhibit delay or jitter, a process engine for a given task may be geographically farther than the process engine for another task, or the network connection associated with the processing of a particular task may be congested as compared to the network connection associated with another task. Thus, the orchestration engine 104 can assign a higher priority to a task associated with network delays (for various reasons) as compared to the same task that is not associated with network delays.

Still referring to FIG. 2, at 204, the orchestration engine 104 can predict a given task's runtime. That is, in some cases, the orchestration engine 104 can predict how long a given task will take to complete. In some examples, at 203, the orchestration engine 104 monitors tasks 108 to obtain metrics associated with past task performances. Thus, the orchestration engine 104 may obtain historical performance data associated with the computing tasks and/or the computing instances 106. The orchestration engine 104 can apply machine learning to model runtimes of various tasks based on the past performances of tasks. Thus, when a task request is received, the orchestration engine 104 can predict its runtime, at 204. In particular, the orchestration engine 104 can generate predicted runtimes for the computing tasks 108 based on the historical performance data that is associated with the computing tasks 108 or the computing instances 106. Additionally, or alternatively, the orchestration engine 104 can collect performance data associated with the network 112, and can generate the predicted runtimes for the computing tasks 108 based on the performance data associated with the network 112.

The predicted runtime of a given task can also be compared to a predefined threshold associated with the task, at 204. In an example, when the predicted runtime is greater than the predefined threshold, an alarm indication is triggered, at 205. The predefined threshold may represent a critical time duration during which the associated task is intended to be completed. In an example, if a given task is not executed within its critical time duration, significant consequences may result, such as a delay or shutdown of operations in an industrial setting. Thus, to avoid or mitigate such consequences, various actions may be performed in response to the alarm indication being triggered when a predicted runtime is greater than its respective predetermined threshold. For example, when a predicted runtime is greater than its respective predetermined threshold, the orchestration engine 104 can determine the process engine 110 associated with the predicted runtime, and the orchestration engine 104 can send an alarm to the determined process engine 110, at 207. In doing so, the process engine 110 can take an action to mitigate the task runtime that is predicted to be greater than its threshold. By way of example, the task request can indicate the process engine 110 that originated the task request.

In another example, when at least one of the predicted runtimes is greater than its predetermined threshold, the orchestration engine 104 can identify additional computing instances 106 that have available computing resources. In doing so, the orchestration engine 104 can expedite tasks having predicted runtimes that are too long, for example, by identifying additional computing resources and using those additional computing resources to execute the expedited tasks. Alternatively, or additionally, the orchestration engine 104 can adjust, for instance increment, the priority of a given task that has a predicted runtime that is greater than a predetermined duration. In doing so, the orchestration engine 104 can expedite tasks based on their respective predicted runtimes.

With continuing reference to FIG. 2, the orchestration engine 104 determines a schedule and allocation scheme for tasks 108, for instance for the execution of every task 108 that is received by the orchestration engine 104. The schedule and allocation scheme may define when each of the computing tasks 108 are performed, and which of the plurality of selected computing instances 110 performs each of the plurality of computing tasks 110. The orchestration engine 104 may determine the schedule and allocation scheme for tasks 108 based on the corresponding predicted runtimes, task requirements, and available computing resources. In particular, at 206, the orchestration engine 104 generates an optimization problem, and at 208, solves the optimization problem so as to generate the schedule and allocation scheme. The optimization problem can be generated based on the priority order of the task requests and the available computing resources.

In some cases, the schedule is updated based on an event. For example, an event may trigger the orchestration engine 104 to generate a new or updated schedule and allocation scheme. Example events include new tasks being received, the execution of tasks being completed, or the like. Subsets of events may also trigger an update to a schedule and allocation scheme. Example subsets include, without limitation, a task deadline is violated or an issue with the computing instances 106 is identified. Alternatively, or additionally, the orchestration engine 104 may generate a schedule periodically.

In an example, after the predicted runtime is generated at 204, it can define an input, at 209, to the optimization problem that is generated at 206. In some cases, when the predicted runtime of a given task is less than the predetermined threshold, an input is triggered, at 209. The input may include the predicted runtime for a particular task or group of tasks. As described above, the predetermined threshold may represent a critical time duration during which the associated task or group of tasks is intended to be completed. Alternatively, or additionally, the predetermined threshold may represent a time of time of day at which the associated task or group of tasks needs to be completed. The predicted runtime may indicate a range of time durations during which the associated task or group of tasks is predicted to be completed. Alternatively, or additionally, the predicted runtime may indicate a specific time duration during which the associated task or group of tasks is predicted to be completed. The predicted runtime may also or alternatively indicate a time of day, or a range of times of day, at which the associated task or group of tasks is predicted to be completed.

Various task information and resource information can also define inputs, at 211, to the optimization problem that is generated at 206. For example, after the tasks are processed at 202 to determine their respective priorities, those task priorities can be input into the optimization problem. More generally, the tasks 108 can indicate their respective task requirements, and those task requirements can be input, at 211, to the optimization problem that is generated at 206. Further, as described above, the orchestration engine 104 can monitor the computing instances 106 to select computing instances having available computing resources. The available computing resources can be input, at 211, into the optimization problem. Thus, in an example, the optimization includes predicted runtimes, available computing resources, task requirements, and/or task priorities as inputs. In some case, the optimization may further include the status of the network 112 or predicted effects of the network 112 as an input. In an example, the optimization is generated each time that the schedule is updated. With respect to available computing resources, the optimization particularly account for the current load of the available computing instances. As further described below, the output of the optimization can be processed at 202 to produce the allocation and schedule schemes.

After the optimization problem is generated, at 206, the problem can be provided to a solver, at 213. At 208, the optimization problem is solved so as to generate an output. The output generated at 208 can include the schedule and allocation scheme. In an example, at 208, a discrete stochastic optimization is performed to generate the schedule and allocation scheme. Thus, the discrete stochastic optimization can be performed using the predicted runtimes, task requirements, and available computing resources as inputs to the discrete stochastic optimization. In an example, a discrete stochastic optimization is performed when each task 108 is received by the optimization engine 104. That is, one or more task requests, for instance a predefined number of task requests, being received by the optimization engine 104 may trigger the optimization, in particular an iteration of the optimization, at 208. Alternatively, or additionally, the optimization engine 104 may periodically perform the optimization to generate an updated schedule and allocation scheme. Thus, it will be understood that schedule and allocation schemes may be generated at various times or responsive to various triggers as desired.

Still referring to FIG. 2, the schedule and allocation scheme can be output, at 215, as a result of the optimization performed at 206 and 208. At 202, the orchestration engine 104 can process the received tasks 108 in accordance with the schedule and allocation scheme. In particular, at 217, instructions may be sent by the orchestration engine 104 to the computing instances 106 that are selected to execute the computing tasks 108. The instructions can identify the one or more computing instances 106 that are selected to perform the respective computing task or group of tasks, in accordance with the allocation scheme. The instructions may also indicate a time or order associated with when each task should be performed, in accordance with the schedule that is generated at 208. In response to the instruction at 217, the plurality of computing tasks 108 are executed by the plurality of select computing instances 106.

The orchestration engine 104 may monitor the execution of the tasks by the computing instances 106. In some cases, if the execution of a particular task encounters delays, for instance such that the task misses a deadline, the orchestration engine 104 detects the delay in executing the task. In response to detecting the delay, the orchestration engine 104 can increment or raise the priority associated with the delayed task the next time that the delayed task is received, at 201. Similarly, the orchestration engine 104 can monitor the network 112, and can detect whether the network connection associated with a particular task or group of tasks has degraded. In response to detecting that the network connection associated with a particular task or group of tasks has degraded, the orchestration engine 104 can increment or raise the priority of current and/or future tasks associated with the degraded network connection. In doing so, the orchestration engine can ensure that tasks are completed in accordance their respective requirements, for instance real-time requirements. Similarly, if a degraded network connection is repaired or otherwise returns to its expected operational capabilities, the orchestration engine 104 can decrement or lower the priority of current and/or future tasks associated with the repaired network connection.

The computing tasks 106 can execute the computing tasks 106 in accordance with the schedule and allocation scheme generated by the orchestration engine 104, so as generate results. In some examples, at 219, the results of the executed tasks are returned to the orchestration engine 104. The results may include data and/or operating instructions for the process engines 110. At 207, the orchestration engine 104 can send the results of the executed tasks, over the network 112, to the respective process engines 110 that originated the corresponding task request. Alternatively, or additionally, the computing instances 106 can send the results of the executed tasks directly to the respective process engines that originated the corresponding task requests.

Figure 3:
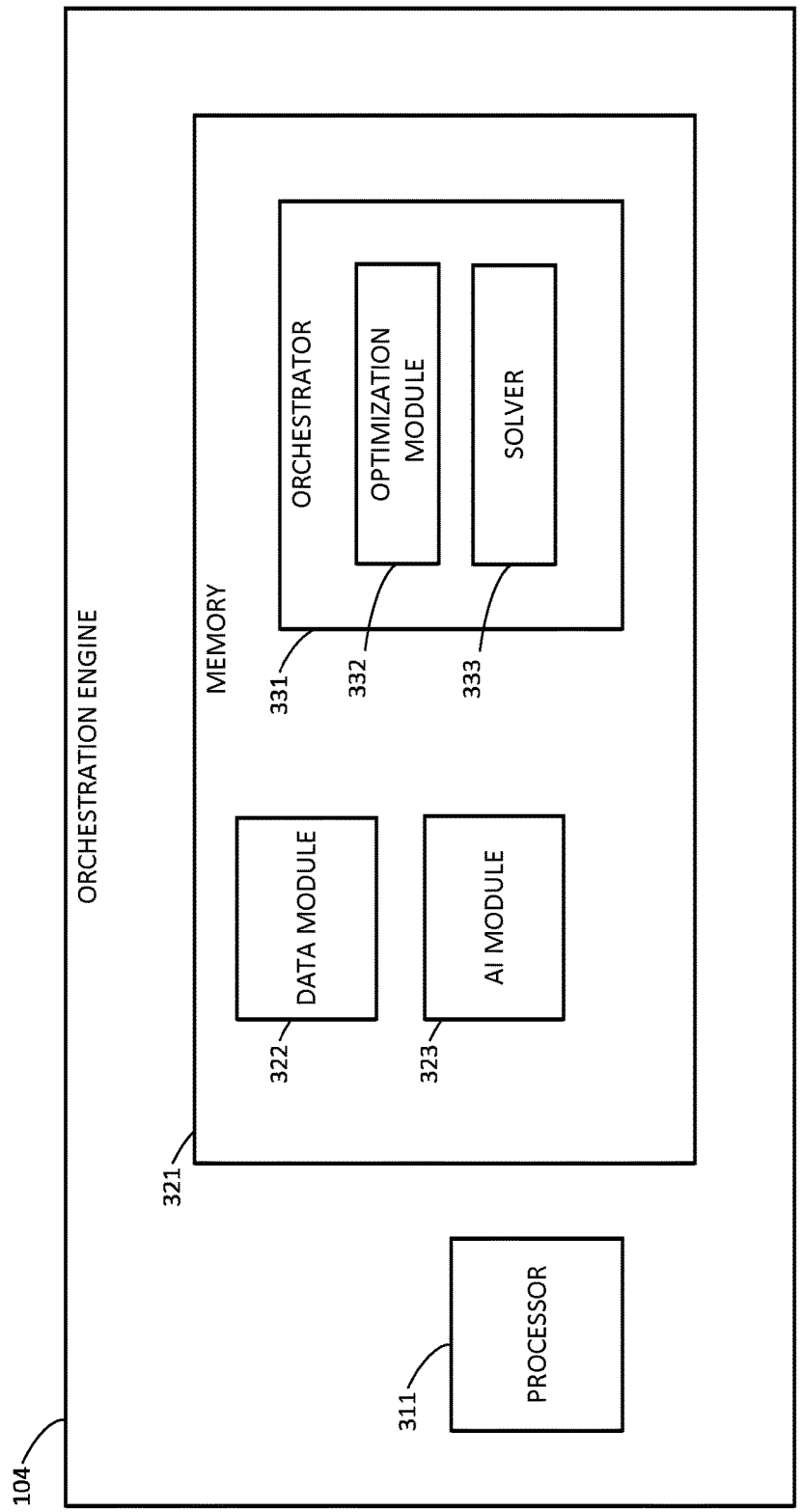
FIG. 3 is a block diagram of an example orchestration engine according to embodiments of this disclosure.

Referring now to FIG. 3, the orchestration engine 104 may include one or more processors 311 and a memory 321 having stored therein applications, agents, and computer program modules to implement the embodiments of this disclosure including a data module 322, an orchestrator module 331, and an artificial intelligence (AI) module 341. The orchestrator module 331 may include an optimization module 332 and a solver module 333. A module may refer to a software component that performs one or more functions. Each module may be a discrete unit, or the functionality of multiple modules can be combined into one or more units that form part of a large program. In the example depicted in FIG. 3, the data module 322, AI module 323, and the orchestrator module 331, are organized to form a program for orchestrating the execution of computing tasks.

The data module 322 may analyze data used in the orchestration of executing computing tasks. For example, the data module 322 may analyze the tasks 108 or task requests, to determine requirements of tasks and/or assign priorities to tasks. The data module 322 may also analyze alarm indications associated with a task or group of tasks, so as adjust task priorities based on the alarm indications. The generation of a given schedule and allocation scheme may be triggered at the data module 322. In particular, in some cases, the data module 322 is where task or container orchestration is triggered and iterated. The data module 322 may serve as the backbone to communicate with different analysis components, such as the AI module 323 and orchestrator 331. The data module 322 may also communicate with nodes external to the orchestration engine 104, such as the computing instances 106 or the process engines 110. For example, the data module 322 can send instructions to the computing instances 106 based on the schedule and allocation scheme. The data module can also receive task requests from, or send task results to, the process engines 110. For example, in some embodiments, the data module 322 includes one or more application programming interfaces (APIs) that allow analysis components to access and update the analysis data. In network-based architectures, a Representational State Transfer (REST) design may be used to access and manipulate the analysis data at the data module 322.

The AI module 323 may monitor the networks to which the orchestration engine 104 is connected. In particular, the AI module may monitor network connections between the orchestration engine 104 and respective process engines 110. The AI module 323 may also monitor the computing resources, for instance computing instances 106, that are available for executing computing tasks. By monitoring, the AI module 323 can obtain historic data related to runtimes of tasks and/or network delays or effects on various task executions. The AI module 323 can use the historic data to make various predictions. For example, the AI module 323 can apply statistical and machine learning to the data to predict a runtime of a given task or group of tasks. Additionally, or alternatively, the AI module 323 can apply statistical and machine learning to the data to predict the network effects (i.e. delays) of a given task or group of tasks. In some cases, the AI module 323 can generate an alarm indication, for example, when a predicted runtime is greater than a predetermined threshold. The predictions or output data of the AI module 323 can be provided to the orchestrator module 331 and/or the data module 322. In an example, predicted runtimes and/or predicted network effects are provided to the orchestrator module 331 so that they can define inputs to an optimization. In some cases, the alarm indications may be provided to the data module 322 so that tasks may be expedited.

The orchestrator module 331 may receive various data or predictions from the data module 322 and AI module 323. In particular, the optimization module 332 may receive data associated with task priorities, task requirements, network statuses, available computing resources, predicted runtimes of tasks, and/or predicted network effects. The optimization module 332 may generate an optimization problem based on the inputs to the orchestrator 331. The solver module 333, which may include one or more solvers, may receive the optimization problems as inputs, and may solve a given optimization problem so as to generate a schedule and allocation scheme as an output. The schedule and allocation scheme can be obtained by the data module 322 so that tasks can be executed in accordance with the schedule and allocation scheme.

Figure 4:
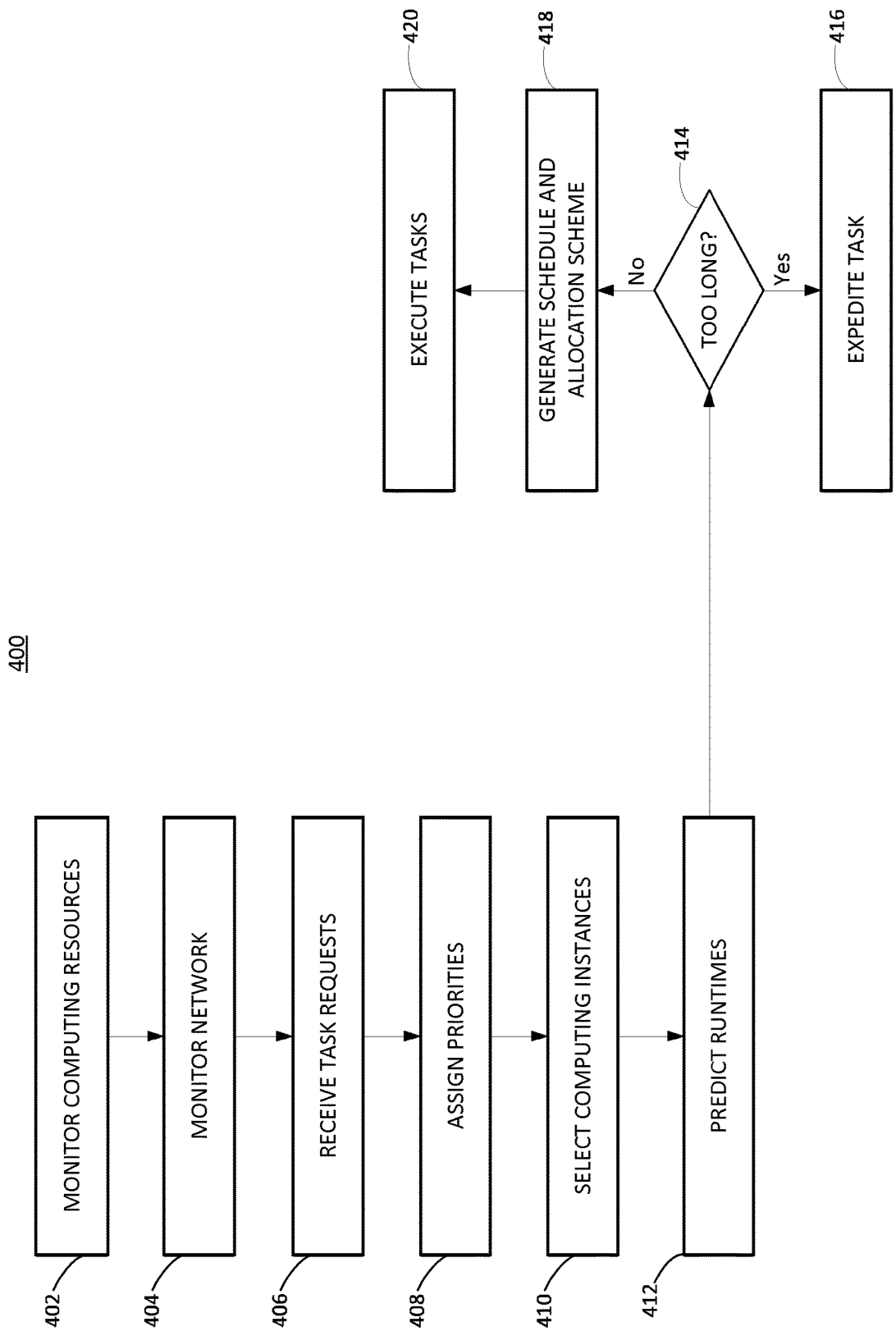
FIG. 4 is a flow diagram of an example process for executing computing tasks according to embodiments of this disclosure.

FIG. 4 shows a flow diagram of an example process 400 for executing a plurality of computing tasks. At 402, a plurality of computing resources is monitored. For example, the orchestration engine 104 can monitor various computing instances 106 having various computing resources. By monitoring the computing instances 106, the orchestration engine 202 can obtain historical performance data associated with the computing tasks and/or the computing instances 106. At 404, one or more network connections are monitored. For example, the orchestration engine 404 can monitor network connections between the orchestration engine 104 and a plurality of process engines 110. By monitoring network connections, the orchestration engine 104 can collect performance data associated with the network, and/or the orchestration engine 104 can identify any issues or delays associated with network connections of the process engines 110.

With continuing reference to FIG. 4, at 406, the orchestration engine 104 can receive one or more task requests. The task requests may be received as containers that indicate computing tasks and task requirements for executing the computing tasks. The tasks requests may be received from process engines or other devices that are remotely located as compared to the orchestration engine. By way of example, the requirements may indicate a time or time duration at which a respective task needs to be completed. At 408, the orchestration engine may assign or determine priorities for each of the tasks or group of tasks. Higher priority tasks may be executed before lower priority tasks. At 410, based on the monitoring performed at 402, the orchestration engine 104 can select computing instances that have available computing resources. At 412, the orchestration engine 104 can predict runtimes associated with the tasks received at 406 in accordance with embodiments of this disclosure. The predictions at 412 may be based on the available computing resources and the task priorities, and thus the task requirements from which the task priorities are generated. The predictions many also be based on data obtained from monitoring at 402 and/or data obtained from monitoring at 404.

Still referring to FIG. 4, in accordance with the illustrated example, at 414, the orchestration engine 104 determines whether the predicted runtime is greater than a predetermined threshold. In particular, for example, the orchestration engine 104 may determine whether the execution of a task or group of tasks is predicted to take too much time. If it is determined that predicted runtime of the task or group of tasks is greater than the predetermined threshold, the process may proceed to 416, where the tasks having the predicted runtime that is too long are expedited, as described herein. For example, an alarm indication can be generated, and the orchestration engine can identify other available computing resources (and associated trade-off costs with utilizing the other available computing resources) to execute the tasks so as to expedite them. By way of further example, at 416, the priorities of the tasks can be incremented so as to expedite the tasks having the predicted runtimes that are greater than respective predetermined thresholds. If it is determined that the predicted runtime of the task or group of tasks is less than the predetermined threshold, the process may proceed to 418, wherein a schedule and allocation scheme is generated. The schedule and allocation scheme may be determined based on the predicted runtimes from 412, as well as the task requirements that may be received at 406. The schedule and allocation scheme may also, or alternatively, be based on the priorities assigned at 408. Further still, the schedule and allocation scheme may be based on the available computing resources of the computing instances that are selected at 410, and/or the network data that is obtained at 404. The schedule and allocation scheme may define when each of the computing tasks or group of computing tasks is performed. The schedule and allocation scheme may also define which of the selected computing instances performs each of the plurality of computing tasks. At 420, in accordance with the illustrated example, the selected computing instances execute the computing tasks according to the schedule and allocation scheme.

Figure 5:
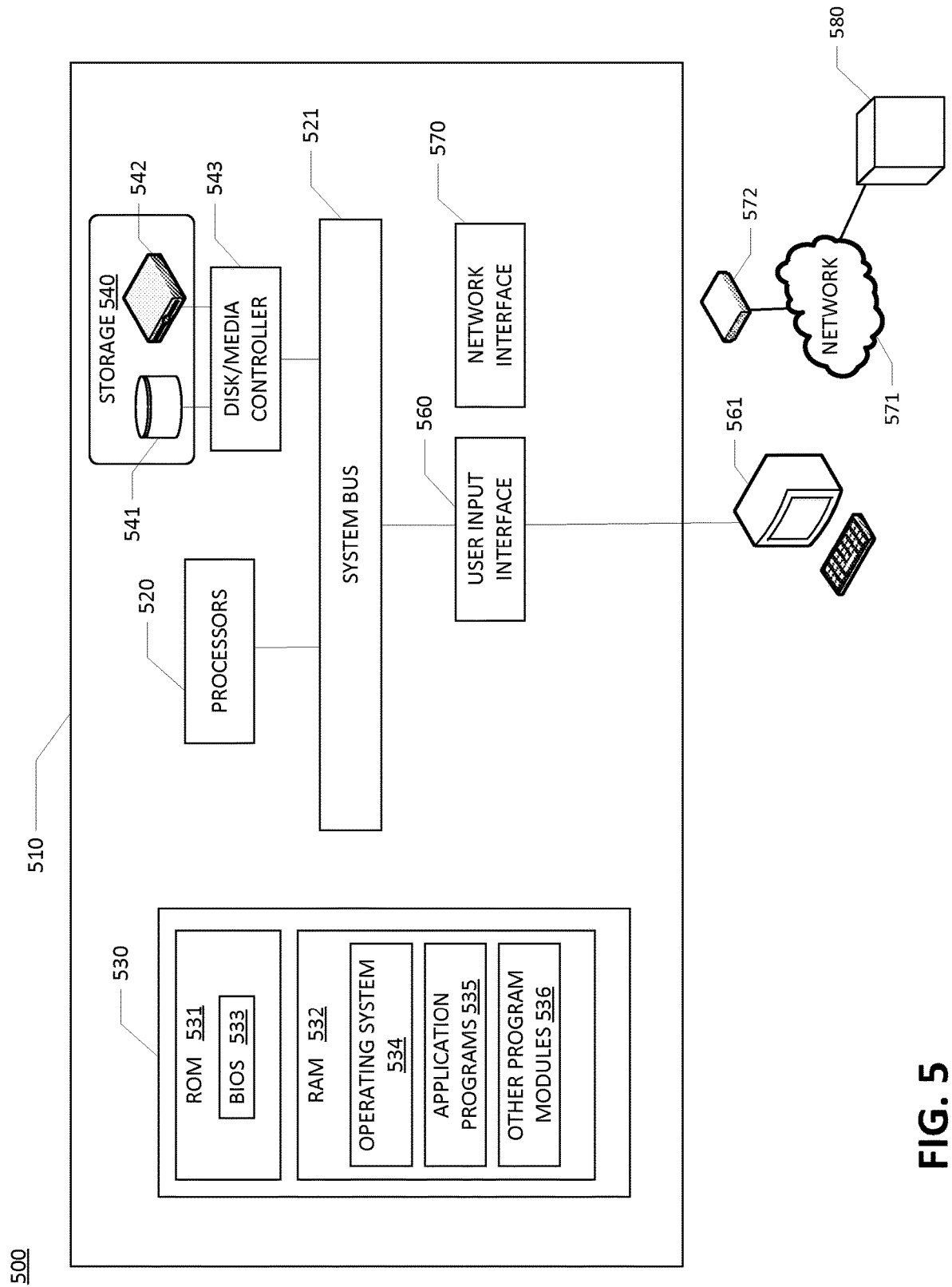
FIG. 5 shows an example of a computing environment within which embodiments of the disclosure may be implemented.

FIG. 5 illustrates an example of a computing environment within which embodiments of the present disclosure may be implemented. A computing environment 500 includes a computer system 510 that may include a communication mechanism such as a system bus 521 or other communication mechanism for communicating information within the computer system 510. The computer system 510 further includes one or more processors 520 coupled with the system bus 521 for processing the information.

The processors 520 may include one or more central processing units (CPUs), graphical processing units (GPUs), or any other processor known in the art. More generally, a processor as described herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 520 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor may be capable of supporting any of a variety of instruction sets. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

The system bus 521 may include at least one of a system bus, a memory bus, an address bus, or a message bus, and may permit exchange of information (e.g., data (including computer-executable code), signaling, etc.) between various components of the computer system 510. The system bus 521 may include, without limitation, a memory bus or a memory controller, a peripheral bus, an accelerated graphics port, and so forth. The system bus 521 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

Continuing with reference to FIG. 5, the computer system 510 may also include a system memory 530 coupled to the system bus 521 for storing information and instructions to be executed by processors 520. The system memory 530 may include computer readable storage media in the form of volatile and/or nonvolatile memory, such as read only memory (ROM) 531 and/or random access memory (RAM) 532. The RAM 532 may include other dynamic storage device(s) (e.g., dynamic RAM, static RAM, and synchronous DRAM). The ROM 531 may include other static storage device(s) (e.g., programmable ROM, erasable PROM, and electrically erasable PROM). In addition, the system memory 530 may be used for storing temporary variables or other intermediate information during the execution of instructions by the processors 520. A basic input/output system 533 (BIOS) containing the basic routines that help to transfer information between elements within computer system 510, such as during start-up, may be stored in the ROM 531. RAM 532 may contain data and/or program modules that are immediately accessible to and/or presently being operated on by the processors 520. System memory 530 may additionally include, for example, operating system 534, application programs 535, and other program modules 536. Application programs 535 may also include a user portal for development of the application program, allowing input parameters to be entered and modified as necessary.

The operating system 534 may be loaded into the memory 530 and may provide an interface between other application software executing on the computer system 510 and hardware resources of the computer system 510. More specifically, the operating system 534 may include a set of computer-executable instructions for managing hardware resources of the computer system 510 and for providing common services to other application programs (e.g., managing memory allocation among various application programs). In certain example embodiments, the operating system 534 may control execution of one or more of the program modules depicted as being stored in the data storage 540. The operating system 534 may include any operating system now known or which may be developed in the future including, but not limited to, any server operating system, any mainframe operating system, or any other proprietary or non-proprietary operating system.

The computer system 510 may also include a disk/media controller 543 coupled to the system bus 521 to control one or more storage devices for storing information and instructions, such as a magnetic hard disk 541 and/or a removable media drive 542 (e.g., floppy disk drive, compact disc drive, tape drive, flash drive, and/or solid state drive). Storage devices 540 may be added to the computer system 510 using an appropriate device interface (e.g., a small computer system interface (SCSI), integrated device electronics (IDE), Universal Serial Bus (USB), or FireWire). Storage devices 541, 542 may be external to the computer system 510.

The computer system 510 may also include a field device interface 565 coupled to the system bus 521 to control a field device 566, such as a device used in a production line. The computer system 510 may include a user input interface or GUI 561, which may comprise one or more input devices, such as a keyboard, touchscreen, tablet and/or a pointing device, for interacting with a computer user and providing information to the processors 520.

The computer system 510 may perform a portion or all of the processing steps of embodiments of the invention in response to the processors 520 executing one or more sequences of one or more instructions contained in a memory, such as the system memory 530. Such instructions may be read into the system memory 530 from another computer readable medium of storage 540, such as the magnetic hard disk 541 or the removable media drive 542. The magnetic hard disk 541 and/or removable media drive 542 may contain one or more data stores and data files used by embodiments of the present disclosure. The data store 540 may include, but are not limited to, databases (e.g., relational, object-oriented, etc.), file systems, flat files, distributed data stores in which data is stored on more than one node of a computer network, peer-to-peer network data stores, or the like. The data stores may store various types of data such as, for example, skill data, sensor data, or any other data generated in accordance with the embodiments of the disclosure. Data store contents and data files may be encrypted to improve security. The processors 520 may also be employed in a multi-processing arrangement to execute the one or more sequences of instructions contained in system memory 530. In alternative embodiments, hard-wired circuitry may be used in place of or in combination with software instructions. Thus, embodiments are not limited to any specific combination of hardware circuitry and software.

As stated above, the computer system 510 may include at least one computer readable medium or memory for holding instructions programmed according to embodiments of the invention and for containing data structures, tables, records, or other data described herein. The term "computer readable medium" as used herein refers to any medium that participates in providing instructions to the processors 520 for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 541 or removable media drive 542. Non-limiting examples of volatile media include dynamic memory, such as system memory 530. Non-limiting examples of transmission media include coaxial cables, copper wire, and fiber optics, including the wires that make up the system bus 521. Transmission media may also take the form of acoustic or light waves, such as those generated during radio wave and infrared data communications.

Computer readable medium instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer programs products according to embodiments of the disclosure. It will be understood that each block of the flowchart illustrations and/or block diagrams, and combinations of blocks in the flowchart illustrations and/or block diagrams, may be implemented by computer readable medium instructions.

The computing environment 500 may further include the computer system 510 operating in a networked environment using logical connections to one or more remote computers, such as remote computing device 580. The network interface 570 may enable communication, for example, with other remote devices 580 or systems and/or the storage devices 541, 542 via the network 571. Remote computing device 580 may be a personal computer (laptop or desktop), a mobile device, a server, a router, a network PC, a peer device or other common network node, and typically includes many or all of the elements described above relative to computer system 510. When used in a networking environment, computer system 510 may include modem 572 for establishing communications over a network 571, such as the Internet. Modem 572 may be connected to system bus 521 via user network interface 570, or via another appropriate mechanism.

Network 571 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 510 and other computers (e.g., remote computing device 580). The network 571 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 571.

It should be appreciated that the program modules, applications, computer-executable instructions, code, or the like depicted in FIG. 5 as being stored in the system memory 530 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the computer system 510, the remote device 580, and/or hosted on other computing device(s) accessible via one or more of the network(s) 571, may be provided to support functionality provided by the program modules, applications, or computer-executable code depicted in FIG. 5 and/or additional or alternate functionality. Further, functionality may be modularized differently such that processing described as being supported collectively by the collection of program modules depicted in FIG. 5 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 5 may be implemented, at least partially, in hardware and/or firmware across any number of devices.

It should further be appreciated that the computer system 510 may include alternate and/or additional hardware, software, or firmware components beyond those described or depicted without departing from the scope of the disclosure. More particularly, it should be appreciated that software, firmware, or hardware components depicted as forming part of the computer system 510 are merely illustrative and that some components may not be present or additional components may be provided in various embodiments. While various illustrative program modules have been depicted and described as software modules stored in system memory 530, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for executing a plurality of computing tasks, the method comprising:
   receiving as containers, by an orchestration engine, task requests over a network from a plurality of process engines corresponding to respective machinery or devices, each task request indicating at least one real-time task requirement for executing a respective computing task of the plurality of computing tasks, the orchestration engine being included in a computing platform located remotely as compared to the process engines;
   selecting a plurality of computing instances from a set of computing instances, the selected computing instances each having available computing resources, the computing instances being included in the computing platform and being in communication with the orchestration engine;
   generating a predicted runtime for each of the computing tasks;
   based on the predicted runtimes, task requirements, and available computing resources, determining a schedule and allocation scheme, the schedule and allocation scheme defining when each of the plurality of computing tasks is executed, and which of the plurality of selected computing instances executed each of the plurality of computing tasks;
   executing, by the plurality of selected computing instances, the plurality of computing tasks according to the schedule and allocation scheme;
   sending, by the orchestration engine, results of the executed computing tasks over the network to the process engines, to provide real-time control of the machinery or devices.

2. The method as recited in claim 1, the method further comprising:
   obtaining historical performance data associated with the computing tasks or the plurality of selected computing instances; and
   generating the predicted runtimes for the computing tasks based on the historical performance data.

3. The method as recited in claim 1, the method further comprising:
   collecting performance data associated with the network; and
   generating the predicted runtimes for the computing tasks based on the performance data associated with the network.

4. The method as recited in claim 1, wherein generating the schedule and allocation scheme comprises performing a discrete stochastic optimization using the predicted runtimes, task requirements, and available computing resources as inputs to the discrete stochastic optimization.

5. The method as recited in claim 4, the method further comprising:
   performing the discrete stochastic optimization when each task is received.

6. The method as recited in claim 1, the method further comprising:
   comparing the predicted runtimes to respective predetermined thresholds;
   when a predicted runtime is greater than its respective predetermined threshold, determining the process engine that originated the task request associated with the predicted runtime that is greater than its respective predetermined threshold; and
   sending an alarm to the determined process engine.

7. The method as recited in claim 1, the method further comprising:
   comparing the predicted runtimes to respective predetermined thresholds; and
   when at least one of the predicted runtimes is greater than its predetermined threshold, identifying additional computing resources.

8. The method as recited in claim 1, wherein determining the schedule and allocation scheme further comprises:
   based on the task requirements and performance of the network, generating a priority order for completing the task requests;
   based on the priority order and the available computing resources, generating an optimization problem; and
   solving the optimization problem so as to generate the schedule and allocation scheme as a result of the optimization problem.

9. A system for executing computing tasks, the system comprising:
   a process for executing modules; and
   a memory for storing the modules comprising:
      a data module configured to receive task requests as containers over a network from a plurality of process engines corresponding to respective machinery or devices, each task request indicating at least one real-time task requirement for executing a respective computing task of the plurality of computing tasks, wherein an orchestration engine comprising the data module is included in a computing platform located remotely as compared to the process engines;
      an artificial intelligence module configured to generate a predicted runtime for each of the computing tasks;
      an orchestrator module configured to select a plurality of computing instances from a set of computing instances, the selected computing instances each having available computing resources, the computing instances being included in the computing platform and being in communication with the orchestration engine, wherein the orchestrator module is further configured to, based on the predicted runtimes, task requirements, and available computing resources, determine a schedule and allocation scheme, the schedule and allocation scheme defining when each of the plurality of computing tasks is executed, and which of the plurality of selected computing instances executes each of the plurality of computing tasks, and the data module is further configured to send results of an execution of the computing tasks by the selected computing instances over the network to the process engines, to provide real-time control of the machinery or devices.

10. The system as recited in claim 9, the system further comprising the plurality of selected computing instances that are configured to execute the plurality of computing tasks according to the schedule and allocation scheme.

11. The system as recited in claim 9, wherein the artificial intelligence module is further configured to:
obtain historical performance data associated with the computing tasks or the plurality of selected computing instances; and
generate the predicted runtimes for the computing tasks based on the historical performance data.

12. The system as recited in claim 9, wherein the artificial intelligence module is further configured to:
collect performance data associated with the network; and
generate the predicted runtimes for the computing tasks based on the performance data associated with the network.

13. The system as recited in claim 9, wherein the orchestrator module is further configured to perform a discrete stochastic optimization using the predicted runtimes, task requirements, and available computing resources as inputs to the discrete stochastic optimization, so as to generate the schedule and allocation scheme.

14. The system as recited in claim 9, wherein the artificial intelligence module is further configured to:
compare the predicted runtimes to respective predetermined thresholds;
when a predicted runtime is greater than its respective predetermined threshold, determine the process engine that originated the task request associated with the predicted runtime that is greater than its respective predetermined threshold; and
send an alarm toward the determined process engine.

15. The system as recited in claim 9, wherein the orchestrator module is further configured to:
based on the task requirements and performance of the network, generate a priority order for completing the task requests;
based on the priority order and the available computing resources, generate an optimization problem; and
solve the optimization problem so as to generate the schedule and allocation scheme as a result of the optimization problem.

* * * * *